(12) United States Patent
Rondreux et al.

(10) Patent No.: US 6,763,848 B2
(45) Date of Patent: Jul. 20, 2004

(54) BLOCK OF PNEUMATIC MODULES

(75) Inventors: Serge Rondreux, Guichainville (FR);
Jean-Luc Burban, Herblay (FR);
Daniel Bouteille, Viroflay (FR)

(73) Assignee: Parker Hannifin Rak SA, Annemasse Cedex (FR)

( * ) Notice: Subject to any disclaimer, the term of this patent is extended or adjusted under 35 U.S.C. 154(b) by 125 days.

(21) Appl. No.: 10/234,531

(22) Filed: Sep. 5, 2002

(65) Prior Publication Data

US 2003/0056840 A1 Mar. 27, 2003

(30) Foreign Application Priority Data

Sep. 5, 2001 (FR) .............................. 01 11457

(51) Int. Cl.⁷ ................................................ F17D 1/00
(52) U.S. Cl. ...................................... 137/269; 137/884
(58) Field of Search ................................ 137/269, 271, 137/884

(56) References Cited

U.S. PATENT DOCUMENTS

| | | | | |
|---|---|---|---|---|
| 3,111,139 A | * | 11/1963 | Beckett et al. | 137/884 |
| 3,215,158 A | * | 11/1965 | Bass, Jr. et al. | 137/269 |
| 3,563,131 A | * | 2/1971 | Ridley | 411/384 |
| 4,334,785 A | * | 6/1982 | Blach | 366/79 |
| 4,848,405 A | * | 7/1989 | Albrecht | 137/884 |
| 4,934,411 A | | 6/1990 | Albrecht | |
| 6,619,321 B2 | * | 9/2003 | Reid, II et al. | 137/625.27 |

FOREIGN PATENT DOCUMENTS

| | | |
|---|---|---|
| EP | 0 471 950 | 2/1992 |
| EP | 09014245 | 1/1997 |
| EP | 0 959 280 | 11/1999 |
| FR | 1.462.820 | 2/1967 |

* cited by examiner

*Primary Examiner*—John Fox
(74) *Attorney, Agent, or Firm*—Young & Thompson

(57) ABSTRACT

The invention relates to a block of pneumatic modules consisting of a plurality of adjacent distribution modules, juxtaposed and kept tightened against each other along parallel faces and between two end modules by assembly means passing through all the distribution modules and at least one of the end modules. The assembly means comprise, for each distribution module, a single through rod with a first externally threaded end and a second internally threaded end, the second end of each rod being shaped as a head whose external surface is not of revolution about the axis of the rod and which, in service, at least partially projects from a face of the module through which the rod passes, the face of the adjacent module turned towards the head having a recess corresponding in shape to the above mentioned head.

5 Claims, 1 Drawing Sheet

BLOCK OF PNEUMATIC MODULES

The present invention concerns the assembly of pneumatic modules in a block, such as for example distribution modules.

BACKGROUND OF THE INVENTION

It is known in the field of the controlled supply of pneumatic actuators (jacks, motors etc) how to use controlled distributors interposed between a common pressurised fluid supply pipe, a common exhaust collection pipe and the actuators, these distributors being grouped together in a block of juxtaposed modules, each module comprising a base through which the common pipes pass and surmounted by a distributor associated with a control solenoid valve.

In each base, there therefore exists at least one length of the common pipes which extends between flat opposite faces of the base by means of which it is associated with the bases of the adjacent modules with, between each of them, sealing elements. The holding of a block of modules as a single unit is generally provided by assembly tie rods (two tie rods) which pass through the bases perpendicular to their association faces as well as through at least one end module providing in particular the function of connection of the block to the surrounding pneumatic system.

The drawback of these assembly tie rods lies in the need to adjust their length to that of the block to be formed which, by definition, is variable since it is a function of the number of modules which it contains, a module also being able to take several dimensions in the direction of these assembly tie rods.

In addition, the advantage of the blocks of this type is an ability to be quickly modified in order to adapt the installation to the requirements of the actuators used and to the change in the installation over time. However, modifying the configuration of the block requires dismantling it and therefore withdrawing the two tie rods and refitting others adapted to the new dimension of the modified block. This is a handicap impairing the flexible and adaptable character of this type of installation.

OBJECTS AND SUMMARY OF THE INVENTION

By means of the present invention it is possible to improve the ability to be modified of a block by virtue of means of connecting the bases to each other which are independent of the number and thickness of the bases. In addition these connection means are reduced to a single tightening line, which releases an internal volume in the base which can be used for other purposes such as, all other things being equal, an increase in the cross-sections of the internal channels.

Thus, for this purpose, the object of the invention is a block of pneumatic modules including a plurality of adjacent distribution modules, juxtaposed and kept tightened against each other along parallel faces and between two end modules by connection means passing through all the distribution modules and at least one of the end modules, in which the assembly means comprise, for each distribution module, a single through rod with a first externally threaded end and a second internally threaded end and means for rotationally keying and unkeying each rod with respect to the module which it passes through.

The invention therefore proposes to use only one assembly tie rod which consists of a succession of rods screwed to each other end to end so that it is possible to associate with each module a rod with an appropriate length which is removed from the assembly means or which is added thereto depending on whether a module is being removed or added.

Naturally the block has, on the side of one of its end elements, a sort of nut keyed in this block in order to receive the end of the modular tie rod whilst the other end module of the block has passing through it a rod according to the invention which is provided with a tightening head and which makes it possible to keep all the modules in the block held against each other by tightening. It will be understood that, when a block is disconnected by acting on the head of the above mentioned rod passing through the second end module of the block, there is uncertainty with regard to the prediction of the threaded connection which will break open first. This is because, in such a succession of threaded assemblies of the rods end to end, the separation of one rod with respect to another will take place at the point where the assembly is least capable of transmitting a loosening torque. To mitigate this drawback provision has been made according to the invention for each rod associated with a distribution module of the block to have means, once in place, making it possible to key it rotationally with respect to the distribution block which it passes through. Preferably these means will consist of a head whose external shape is not of revolution about the axis of the rod provided at the internally threaded end of the rod which, when it is in place, projects outside an association face of a module, so as to be received by a recess provided in the association face of the adjacent module with a shape corresponding to the external shape of the head so as to key the rod with respect to this recess by correspondence of shapes.

BRIEF DESCRIPTION OF THE DRAWINGS

Other characteristics and advantages of the invention will appear from the following description of a few embodiments given by way of indication. Reference is made to the accompanying drawings, in which.

MORE DETAILED DESCRIPTION

Figure 1:
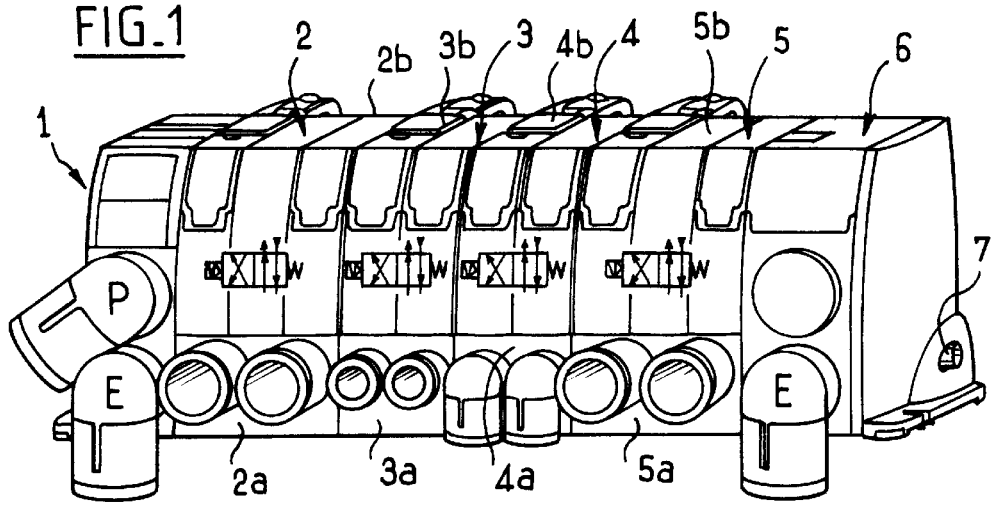
FIG. 1 is an external view of a block of modules according to the invention.

The pneumatic block depicted in FIG. 1 has, in a manner known per se, a first end module 1, pneumatic distribution modules 2, 3, 4, 5 and a second end module 6. Each distribution module carries a base 2a, 3a, 4a, 5a limited in the direction of the length of the module by parallel faces, each base being surmounted by a distributor/solenoid valve assembly 2b, 3b, 4b, 5b. The modules are kept assembled by assembly means 7 described in more detail with regard to the following figures.

Figure 2:
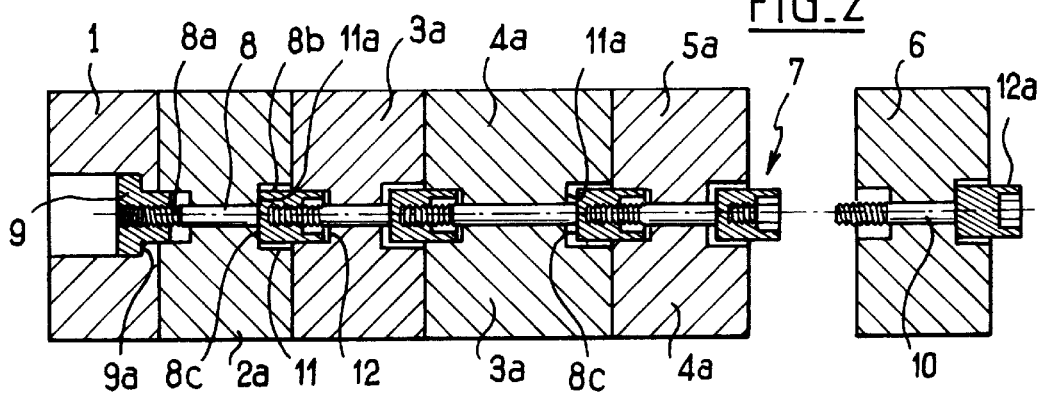
FIG. 2 illustrates schematically the modular tie rod according to the invention.

FIG. 2 shows schematically the distribution module bases 2a, 3a, 4a, 5a through which the assembly means 7 pass. At each distribution module base the assembly means 7 are formed by a rod 8, one end 8a of which is externally threaded and the other, bulging, end 8b of which is internally threaded. Thus the end 8b of each rod can receive the end 8a of the rod associated with the adjacent base. The end module 1 comprises a nut 9 with a shoulder 9a for receiving one end 8a of the rod 8 of the module 2 whilst the other end module 6 has passing through it a screw 10 entering the end 8b of the rod of the module 5 and bearing through its head 10a on the module 6 in order to tighten the stack. In the example depicted in FIG. 2 each rod 8 provides no function of tightening the module which it passes through against the previous module. The tightening of the stack is provided solely between the screw 10 and the nut 9 by means of the rods 8. In another variant, which will be described below, each rod 8 fulfils the role of a screw for tightening the module which it passes through against the previous module.

It will be noted in FIG. 2 that each bulging part 8b or rod head at least partially enters a recess 11 in the module which it passes through. The head 8b is normally free in rotation in this recess 11. However, according to the invention, it is useful, after having screwed the rod 8 to the previous rod, to lock the rod with respect to rotation.

In a preferred manner, this locking of each rod with respect to rotation is achieved by a part of the head 8b which projects from the association face of the module which it passes through and a recess 12 in the adjacent module which receives this part of the head 8b. This projecting part of the head 8b—or even the entire head 8b—has an external surface which is not formed by rotation (not cylindrical) about the axis of the rod 8. The recess 12 corresponds in shape to this external surface so that, when two distribution modules are adjacent to each other, the rod 8 of the first module is locked with respect to rotation by the recess 12 in the second module, which accommodates the projecting part of the head 8b.

Figure 3:
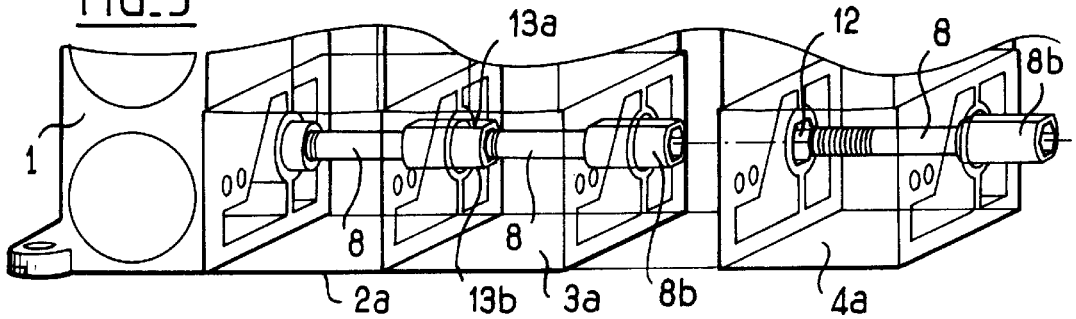
FIG. 3 is a schematic view of a preferred embodiment of the assembly rods according to the invention in their service condition.

An example of the shape of the head 8b in the rod 8 is depicted in FIG. 3. It is in this case a cylindrical shape having two longitudinal flats 13a and 13b. In this figure it can be seen that the recess 12 in a module, for example the module 4, has a contour identical to the contour of the section of the head 8b of each rod 8. It will be noted that the nut 9 could also, although not shown, have a part projecting beyond the association face of the module 1 to the module 2, with the same shape as the head 8b of each of the rods 8.

Figure 4:
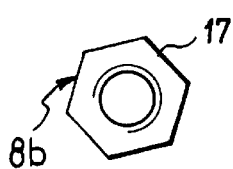
FIGS. 4, 5 and 6 illustrate variant embodiments of the means of immobilising each rod by means of the adjacent module.
Figure 5:
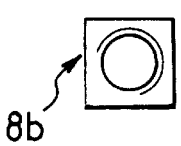
Figure 6:
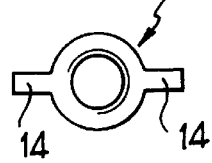

In FIGS. 4, 5 and 6, various possible contours of the head 8b can be seen, able to cooperate with recesses 12 of similar shape. With regard to FIG. 7, the head 8b depicted has two fins 14 which would allow manual manoeuvring of the rod 8 for screwing it into the previous rod, the fins 14 remaining outside the association face of the module through which this rod passes.

The preferred embodiment of the invention is such that each rod 8 constitutes a screw for tightening the module which it passes through to the adjacent module. For this purpose, each head 8b defines a radial shoulder 8c turned towards the externally threaded end and distant from this threaded end 8a by a length such that the rod 8 acts as a screw for tightening the module which it passes through against the adjacent module. For this purpose, the radial shoulder 8c bears on the bottom 11a of the recess 11 before of course the thread is fully locked in the internal thread in the previous rod (or the nut of the end module 1). This arrangement is illustrated in FIG. 2 with regard to the rod-screw 8 passing through the distribution module 2.

In order to carry out each of the tightenings or loosenings, the head 8b has, upstream of its internal thread, a hexagonal recess for fitting a manoeuvring key. It can also be a case of a hexagonal external surface 17 as depicted in FIG. 4, a square as depicted in FIG. 5 or fins 14 already described.

It should be noted that, in this case, at the time of the necessary location of the position of the head 8b around the axis of the rod, the more or less tightened character of the assembly is acted on. By virtue of the elasticity of this assembly in the direction of its tightening, because of the joints between modules in particular, and a sufficiently small thread pitch, it is possible, without impairing the quality of the tightening, to carry out an important modification to the orientation of the head.

It will be understood that, when a module thus assembled is disconnected, manoeuvring the screw 10 can lead only to the separation of the module 6 from the module 5. This is because none of the rods 8 can be driven randomly in rotation by the rod 10 since each is keyed in rotation. The module 6 being disconnected, the rod 8 of the module 5 is then accessible and free to turn inside the module 5 which it passes through in order to be uncoupled from the rod 8 of the module 4 and so on. The disconnection of a block in order to modify its configuration for example is then performed in an ordered manner module after module.

What is claimed is:

1. A block of pneumatic modules including of a plurality of adjacent distribution modules, juxtaposed and kept tightened against each other along parallel faces and between two end modules by assembly means passing through all the distribution modules and at least one of the end modules, wherein the assembly means comprise, for each distribution module, a single through rod with a first externally threaded end and a second internally threaded end, in that the second end of each rod is shaped as a head whose external surface is not of revolution about the axis of the rod and which, in service, at least partially projects from a face of the module through which the rod passes and in that the face of the adjacent module turned towards the head has a recess corresponding in shape to the above mentioned head.

2. A block according to claim 1, wherein the rod has, on the side of its internally threaded end, a radial surface for its abutment on the module which it passes through.

3. A block according to claim 2, wherein the head has means of manoeuvring it rotationally.

4. A block according to claim 1, wherein one of the end modules is provided with an insert for screwing the end of the rod passing through the immediately adjacent distribution module.

5. A block according to claim 4, wherein the block is provided with a second end module and the rod passing through said second end module is provided with a tightening head.

* * * * *